United States Patent

[11] 3,598,999

| [72] | Inventor | Laurence C. Hofmeister<br>Fort Lauderdale, Fla. |
|---|---|---|
| [21] | Appl. No. | 799,774 |
| [22] | Filed | Feb. 17, 1969 |
| [45] | Patented | Aug. 10, 1971 |
| [73] | Assignee | The Bendix Corporation |

[54] PROPORTIONAL TRIM CONTROL SYSTEM FOR AIRCRAFT
11 Claims, 7 Drawing Figs.

[52] U.S. Cl............................................. 250/204,
73/144, 244/77 F, 250/231 R
[51] Int. Cl....................................................... G01j 1/36
[50] Field of Search........................................... 73/144;
250/204, 231; 244/77 F

[56] References Cited
UNITED STATES PATENTS

| 1,964,874 | 7/1934 | Fankboner | 250/231 X |
| 2,033,499 | 3/1936 | Wahl | 250/231 X |
| 2,362,626 | 11/1944 | Giffen | 73/144 |
| 2,661,623 | 12/1953 | Brink | 73/144 |
| 3,253,153 | 6/1966 | Stoddard | 250/231 X |
| 3,268,187 | 8/1966 | Younkin et al. | 244/77 F X |
| 3,403,546 | 10/1968 | Stratton | 73/144 X |
| 3,447,304 | 6/1969 | Gelfand | 73/144 X |

FOREIGN PATENTS

| 1,088,261 | 9/1954 | France | 73/144 |

Primary Examiner—James W. Lawrence
Assistant Examiner—C. M. Leedom
Attorneys—Plante, Arens, Hartz, Hix & Smith, Bruce L. Lamb, William G. Christoforo and Lester L. Hallacher ABSTRACT: A proportional trim sensor for in-flight aircraft is disclosed. The system operates off a differential which exists in the tension of control cables when a correction is required. A sensor yields an output which is indicative of the magnitude and direction of tension difference. A utilization circuit receives the output and corrects the aircraft attitude to equalize the tension.

PATENTED AUG 10 1971
3,598,999
SHEET 1 OF 2
FIG.1
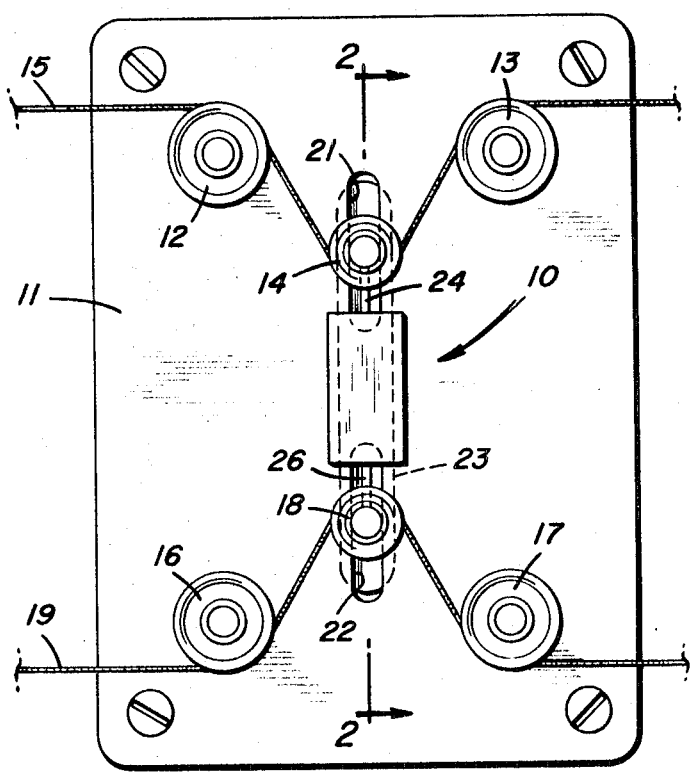
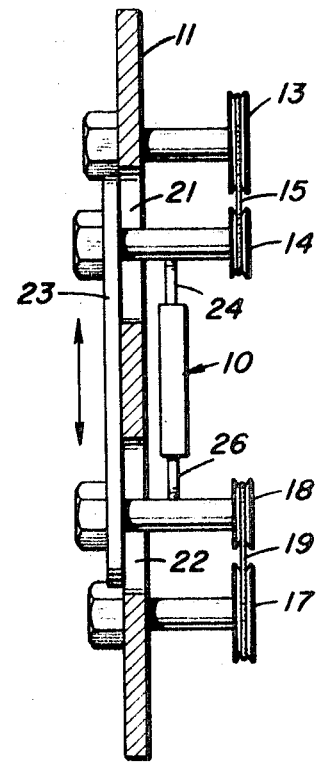
FIG.2
FIG.3
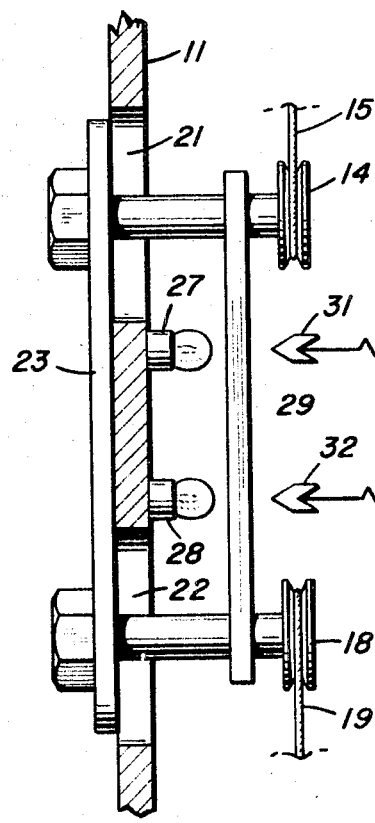
INVENTOR
Laurence C. Hofmeister
BY
ATTORNEY INVENTOR
Laurence C. Hofmeister

BY
ATTORNEY

PROPORTIONAL TRIM CONTROL SYSTEM FOR AIRCRAFT

During flight, the attitude of an aircraft must be continually adjusted in order to maintain the desired attitude. This is true if the aircraft is in a climb, approach or a normal flight attitude. The continual adjustment is normally called trim and is frequently done manually by the pilot of the aircraft. During normal flight conditions manual adjustment is not particularly objectionable because the pilot is relatively free of other duties, however, during takeoff, approaching, climbing and landing, the pilot is more fully occupied with other functions and consequently, relief from the trim function is necessary. Accordingly, an automatic trim system is desirable when the aircraft is under the manual control of the pilot.

Such a system is also desirable when the aircraft is under the control of an automatic pilot system. If the aircraft is not properly trimmed the automatic pilot will be required to continually correct for changes in trim. This, coupled with required corrections or desired attitude changes, frequently results in high and sometimes excessive demands from the autopilot. This is not only deleterious to the automatic pilot system but it can also, on occasion, give rise to a hazardous situation.

Automatic trim systems have been proposed in the past. These systems usually correct the pitch of the aircraft because changes in this flight characteristic are most pronounced and most frequent. The presently available automatic trim systems are advantageous over complete manual trimming. However, they suffer a major disadvantage in that they are not proportional systems. They are either on or off and accordingly do not alter the correction signal in accordance with the magnitude of the correction needed.

The instant invention is directed to a proportional automatic trim system which applies only the correction needed and which utilizes the mechanical features of the mechanical trim system. The manual trim system is ordinarily controlled by a pair of tension cables which extend in generally parallel relationship from the aircraft cockpit to the attitude control surfaces. In a pitch-correcting system the control surfaces are the trim tabs of the aircraft. A correction is made when the pilot exerts a pressure on one of the cables through a control wheel or stick thereby causing the trim tabs to rotate upwardly or downwardly. Obviously the roll and yaw of the aircraft can also be trimmed by use of similar systems, and the inventive system is useful in controlling these characteristics as well as the pitch characteristic.

Another advantage of proportional trim systems stems from the fact that it is possible to display out-of-trim conditions on a meter. This meter, called a pitch trim indicator, becomes important when a failure occurs in the automatic trim system, or when the autopilot system has no automatic trim system, as is the case in many low-cost systems. The value of a pitch trim indicator is realized if a condition arises wherein a large aerodynamic change occurs and the primary servo is holding considerable tension. Disengagement of the autopilot under such conditions will result in a sudden attitude change of the aircraft because the trim tab will not be in the correct orientation.

A proportional trim system eliminates this danger because its output can be continually displayed on the pitch trim indicator, thereby presenting visual evidence of the hazardous condition. A nonproportional, or switch system, is disadvantageous because small out-of-trim conditions cannot be displayed. Only a null or full-deflection conditions can be displayed, depending upon whether or not the switch contacts are closed. This makes it very difficult, if not impossible to set pitch trim manually using the pitch trim indicator as a reference.

The instant invention utilizes the differential tension in the control cables to maintain the desired attitude. When the aircraft attitude changes because of changes in power settings, pressure changes due to altitude changes, aircraft weight changes due to fuel consumption, movement of passengers, actuation of flaps, gear, etc., tension in the two cables becomes unequal. The inventive system senses this tension inequality and generates a correction signal which is proportional to the tension differential in both magnitude and sense. The correction signal is applied to a control surface and equalizes the cable tensions thereby correcting the control surfaces to the desired orientation.

It is therefore an object of this invention to provide an automatic trim system for aircraft.

It is another object to provide such a system which is operative in aircraft having only manual controls and also with aircraft having automatic pilot systems.

It is another object to provide such a system which detects changes in the tension of parallel control cables and generates a control signal proportional to the differential in the tension of the two cables.

It is another object to provide such a system which yields an output signal which is proportional to the tension difference and therefore is a proportional control system.

Further objects, features and advantages of the invention will become apparent from the following description and claims when read in view of the accompanying drawings, wherein like numbers indicate like parts and in which:

FIG. 1 shows the control cables as well as the sensor for detecting the differential in tension in the two cables.

FIG. 2 is a sectional view taken along the line II–II of FIG. 1.

FIG. 3 is a view similar to that of FIg. 2 but further including a preferred embodiment of the tension differential sensor.

Figure 4:
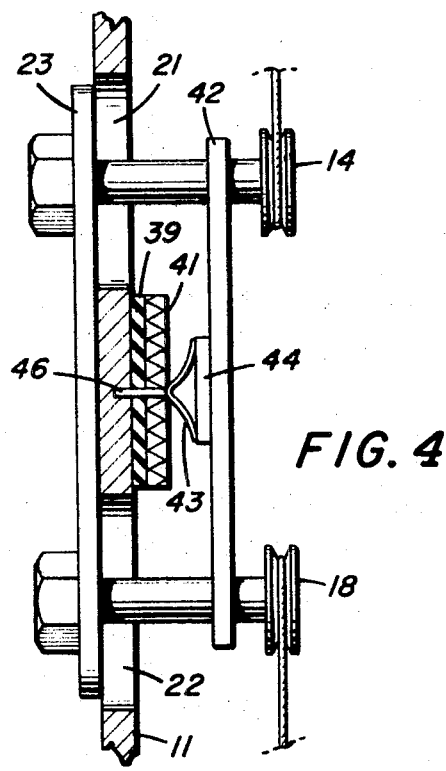
FIG. 4 is a view similar to FIG. 2 showing a second preferred embodiment of the tension differential sensor.

In FIG. 1 the tension differential sensor is indicated generally by reference numeral 10. The sensing system includes a Baseplate 11. Mounted upon base 11 are a first pair of idler pulleys 12 and 13 and first sense pulley 14. A control cable 15 passes over idler pulleys 12 and 13 and around sense pulley 14. A second pair of idler pulleys 16 and 17 cooperate with the sense pulley 18 to respond to tension changes in cable 19. One end of cables 15 and 19 is ordinarily connected to the control instrument such as a stick or wheel which the pilot uses to manually actuate the control cables 15 and 19 to effect the actual position of the control surfaces. And the other ends of cables 15 and 19 are connected to the control surfaces through a mechanical system, such as a bellcrank. The exact nature of the coupling of the two ends of cables 15 and 19 to the mechanical mechanisms is presently used and is well known in the art and, therefore, need not be elaborated upon here. Pulleys 12, 13, 14, 16, 17 and 18 are mounted to freely rotate with respect to the baseplate 11 and, therefore, cables 15 and 19 are free to move with respect to baseplate 11.

As best shown in FIG. 2 sense pulleys 14 and 18 are respectively mounted in slots 21 and 22. Sense pulleys 14 and 18 are therefore capable of lateral movement within slots 21 and 22. However, sense pulleys 14 and 18 are mechanically coupled by an element 23 and therefore will move in unison upwardly or downwardly depending upon the tension differential in cables 15 and 19.

Referring again to FIG. 1, when the tension in cables 15 and 19 is equal the sense pulleys 14 and 18 will assume a position which is located equally between the pairs of idler pulleys. Obviously, sensor 10 will assume a similar position because of its mechanical connection to sense pulleys 14 and 18, diagrammatically illustrated by connections 24 and 26 of FIG. 2. However, should the elevator surfaces move, for example upwardly, the tension in cables 19 will be substantially increased while that in cable 15 will be substantially decreased. Consequently, cable 19 will pull sensor 10 downwardly because of the additional force on pulley 18. Because sense pulley 14 is mechanically coupled to sense pulley 18 it also will move downwardly. The downward movement of sense pulleys 14 and 18 and sensor 10 results in an output signal from the sensor unit as will be more fully disclosed hereinafter. As the correction signal is utilized to apply a corrective force to the elevator surfaces the tension in cables 15 and 19 gradually equalizes until the position of the surfaces is fully corrected. At this point the sensor 10 has returned to its neutral position and no output is generated by the sensor 10.

Figure 5:
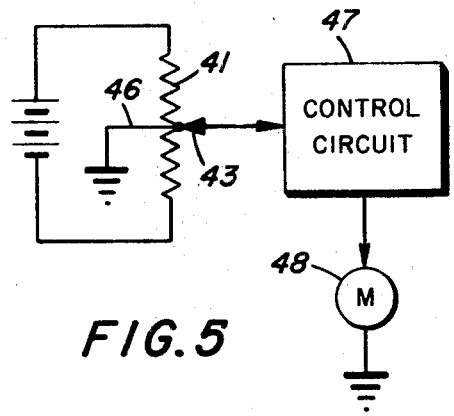
FIG. 5 is a simplified circuit diagram useful with he sensor embodiment of FIG. 4.

FIG. 3 shows a preferred embodiment of the sensor 10. The sensor includes two long-life lamps 27 and 28 and a variable-density light filter 29. The light from lamps 27 and 28 passes through filter 29 and impinges upon photosensitive elements 31 and 32, respectively. Filter 29 is designed such that the photosensitive elements 31 and 32 receive an equal amount of light from lamps 27 and 28 respectively when the sensing unit is in the null position. However, when the tension in cables 15 and 19 is unequal, filter 29 moves upwardly or downwardly along with sense pulleys 14 and 18. Assuming that filter 29 moves downwardly, the light received by photosensitive element 31 from lamp 27 will decrease while that received by photosensitive element 32 from lamp 28 will remain the same. This results in an output from sensor 10. The output of sensor 10 serves as an input to motor 33 and is applied through the resistor 34 and control circuit 36. Motor 33 is connected to the aircraft control surface through trim cables and mechanical connections which are shown as they are presently known in the art. Upon reception of the output from sensor 10, motor 33 will rotate, for example, counterclockwise causing the elevator surface to approach its normal position until the input to photosensitive elements 31 and 32 is again equalized. At this point, the input to the motor 33 has returned to zero, and the correction function completely ceases. In the event of an upward movement of sense pulleys 14 and 18 and its consequent movement of filter 29, the control signal is applied to motor 33 through resistor 37 and control circuit 38 resulting in a clockwise movement of motor 33 and therefore a corrective force being applied in the opposite direction. It should be noted that the control circuitry shown in FIGS. 3 and 5 is greatly simplified and exemplary only. A full description of a useful circuit is described in application Ser. No. 799,775 filed by Laurence C. Hofmeister of even date herewith, entitled "Solid State Trim Actuator" and assigned to the same assignee as the instant invention.

The design of filter 29 is flexible. For example, its movement can result in an increased light transmission to one photosensitive element and a decrease to the other. Alternatively, one can be completely cut off while the other increases. As a third example, light transmission to one photosensitive element can either increase or decrease while it remains constant to the other. Any of these and other characteristics of the filter 29 are within the contemplation and scope of the inventive concept.

FIG. 4 shows another preferred embodiment of the tension differential sensing unit. In this embodiment in insulating element 39 retains a resistance element 41, the center 46 of which is connected to ground or to a reference potential. The insulating base 39 and resistance element 41 are permanently affixed to baseplate 11. A tie bar 42 is connected to move with sense pulleys 14 and 18 as they move upwardly or downwardly. A slidable contact 43 is affixed to tie bar 42 through an insulating pad 44. When the tension in cables and 19 is equal contact 43 rests on the reference center 46 of resister 41 and no output is presented to the control circuit. When tension in cables 15 and 19 becomes unequal the contact 43 will slide upwardly or downwardly on resistor 41 resulting in an output to the control circuitry.

As best shown in FIG. 5 the upward or downward movement of contact 43 along resistor 41 results in either a positive or negative voltage to be applied to control circuit 47 resulting in the application of a correction signal to motor 48 and clockwise or counterclockwise rotation of the motor. The magnitude of the signal is dependent upon the distance contact 43 moves along resistor 41. If center tap 46 is not grounded an upward movement of contact 46 results in a decrease in the voltage applied to control circuit 47. This is a negative change and therefore is a negative control signal. A downward movement of contact 43 increases the input voltage to control circuit 47 and therefore can be considered as a positive control signal. The sensor is therefore polarity sensitive even if center tap 46 is not provided. However, if center tap 46 is maintained at a reference potential above ground it must be offset in control circuit 47 to prevent a constant rotation of motor 48.

Figure 6:
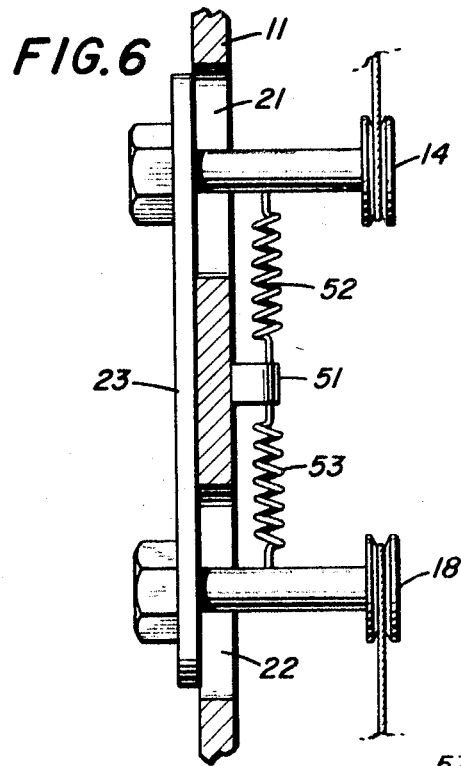
FIG. 6 shows another preferred embodiment utilizing strain gauges.

Another preferred embodiment is shown in FIG. 6. In this embodiment baseplate 11, sense pulleys 14 and 18, and connection 23 are identical to the preceding embodiments. A pair of identical strain gauges 52 and 53 are respectively physically attached to sense pulleys 14 and 18 at one end. The strain gauges 14 and 18 are attached to baseplate 11 by a coupler 51 at the other end. Coupler 51 is fixed to baseplate 11 and therefore remains stationary for all displacements of sense pulleys 14 and 18. Consequently, movement of sense pulleys 14 and 18 either upwardly or downwardly results in the compression of one of the strain gauges and the stretching of the other. This results in the application of a control signal to the elevator surfaces, as best seen in FIG. 7.

Figure 7:
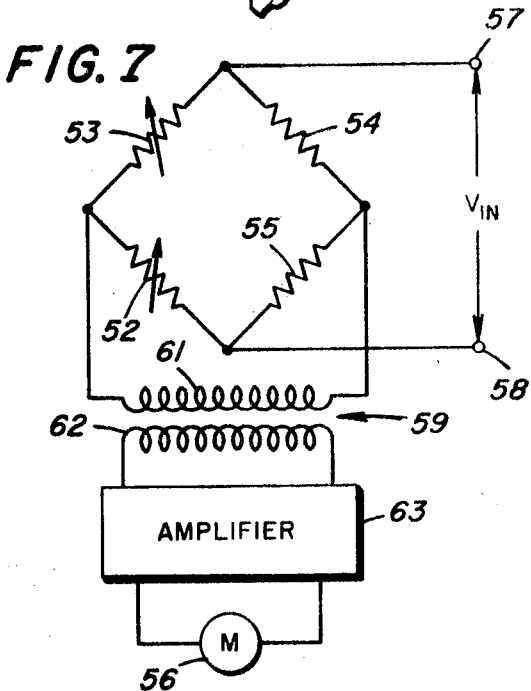
FIG. 7 shows a bridge circuit useful with the embodiment of FIG. 6.

In FIG. 7 strain gauges 52 and 53 form a bridge network with resistors 54 and 55. The values of resistors 54 and 55 are identical so that the bridge is balanced when sense pulleys 14 and 18 are in the null position. Accordingly, equal currents flow through the two legs of the bridge when the energizing potential is applied to input terminals 57 and 58. The energizing potential is applied when the system is placed into operation and accordingly is normally present when the aircraft is under the control of the automatic systems. Because the currents through the two sides of the bridge are equal, both sides of transformer 59 are at the same potential and it does not produce an output voltage on secondary 62. Motor 56 therefore does not rotate for this condition of the bridge circuit. When sense pulleys 14 and 18 change positions in response to a tension differential, the resistance of one strain gauge increases and that of the other decreases. This results in an imbalance of the bridge and the two sides of motor 56 are at different potentials because it receives the amplified differential through amplifier 63 and transformer 59. Motor 56 thus rotates in a direction dependent upon the polarity of the voltage across it. The magnitude of the voltage across motor 56 is obviously proportional to the displacement of sense pulleys 14 and 18 because the resistance change of the strain gauges is a function of this displacement. The polarity and magnitude of the voltage across motor 56 are therefore indicative of the direction and distance respectively of movement of sense pulleys 14 and 18.

It should be noted that the bridge circuit is shown having a strain gauge in each leg. This is done to increase the potential across motor 56. The circuit can include a single strain gauge in only one of the legs and still produce a useful output signal. Also any type of balanced circuit can be used, in lieu of the bridge circuit shown. The number of strain gauges and circuit configuration is intended to be limited only by the scope of the claims.

It should be noted that in all of the embodiments of the sensor unit shown in FIGS. 3, 4 and 6, the control signal which is applied to the motor is proportional to the linear displacement of sense pulleys 14 and 18 from their null position. Obviously, this displacement is directly proportional to the differential in tension of the control cables 15 and 19. Accordingly, the control signal applied to the control circuitry is directly proportional to the tension differential and the magnitude of the control signal will therefore decrease as the null position is reached. This is a major advantage of the system in that it substantially reduces the hunting of the system as the sensor reaches the null position and also eliminates the abrupt control forces applied by an on-off type of system.

Although this invention has been described with respect to particular embodiments thereof, it is not to be so limited, as changes and modifications may b made therein which are within the spirit and scope of the invention as defined by the appended claims.

The invention I claim is:

1. A system for maintaining a desired tension differential between a pair of cables comprising:
   a base;
   means connected to each cable and slidably attached to said base so as to be displaced linearly in a first direction when the tension in a first cable of said pair of cables exceeds the tension of a second cable of said pair and to be displaced in the opposite direction when the tension in said second cable exceeds the tension in said first cable, said displacement being proportional to and tending to equalize said tension differential;
   means for detecting said displacement and providing an output proportional thereto; and
   means for receiving said output and providing a mechanical motion proportional thereto, for adjusting said cable tension to maintain the desired differential.

2. A system as recited in claim 1 wherein said means for detecting comprises:
   an energy source; and
   means for varying the output of said energy source, said means for varying being mechanically connected to said means connected to each cable so that said output varies proportionally to said displacement.

3. A system as recited in claim 2 wherein said means for receiving includes an electric motor and at least one motor-control circuit.

4. A system as recited in claim 3 wherein:
   said means for varying includes a variable-density light filter;
   said energy source includes a plurality of light sources; and
   said energy-receiving means includes additionally a plurality of photosensitive elements;
   said light sources and said photosensitive elements being disposed on opposite sides of said variable-density light filter and being so arranged that each said photosensitive element receives light from one of said light sources, said light having passed through said variable-density light filter.

5. The system of claim 4 wherein there are two of said light sources, said light sources being symmetrically positioned between said means connnected to each cable; and two of said photosensitive elements, each of said photosensitive elements receiving the light from only one of said light sources; and wherein said photosensitive elements are connected to said motor-control circuit so that movement of said filter in one direction causes a first polarity of input signal to said motor-control circuit and a movement of said filter in the opposite direction causes an opposite polarity of input signal to said motor-control circuit.

6. The system of claim 5 wherein the density of said filter varies so that a movement in a first direction causes the light impinging upon one of said photosensitive elements to increase and light impinging upon the other of said photosensitive elements to decrease, and a movement in the opposite direction causes opposite variation in light impinging upon said elements.

7. A system as recited in claim 3 wherein said energy source includes a resistor symmetrically arranged between said means connected to each cable and said means for varying includes a conductive tap in slidable contact with said resistor.

8. The system of claim 7 wherein the center of said resistor serves as a reference position; and said tap rests on said reference position when the tension in said cables is equal.

9. The sensor of claim 8 wherein said reference position is grounded and said tap rests at said ground when the tension in said cables is equal so that said receiving means receives no signal when said cable tensions are equal, and oppositely poled input signals when said tap rests on opposite sides of said reference position.

10. A system as recited in claim 3 wherein said energy source is an electrical energy source having a normally balanced circuit connected thereto, said normally balanced circuit presenting a plurality of similar current paths when said tension differential is nil; and said means for varying includes at least one strain gauge for causing imbalance of said balanced circuit when said means connected to each cable moves.

11. The system of claim 10 wherein
   said balanced circuit is a resistive bridge circuit; and
   said means for varying include two resistive strain gauges constituting two legs of said bridge circuit.